Figure 11:
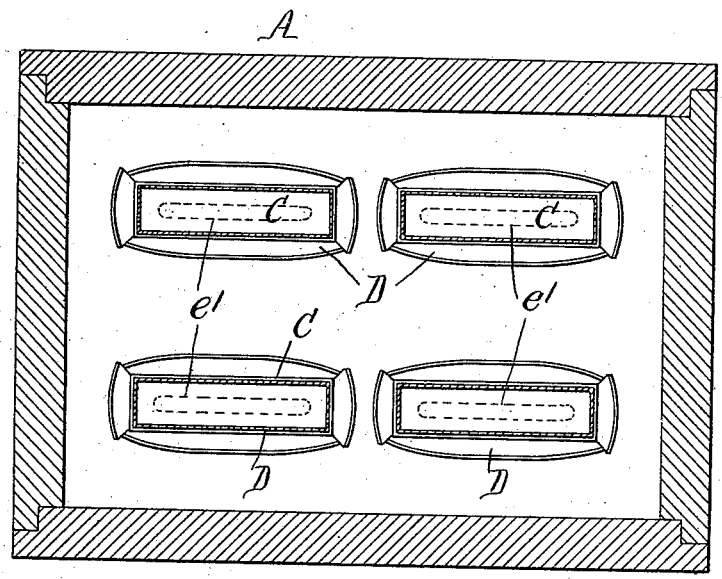

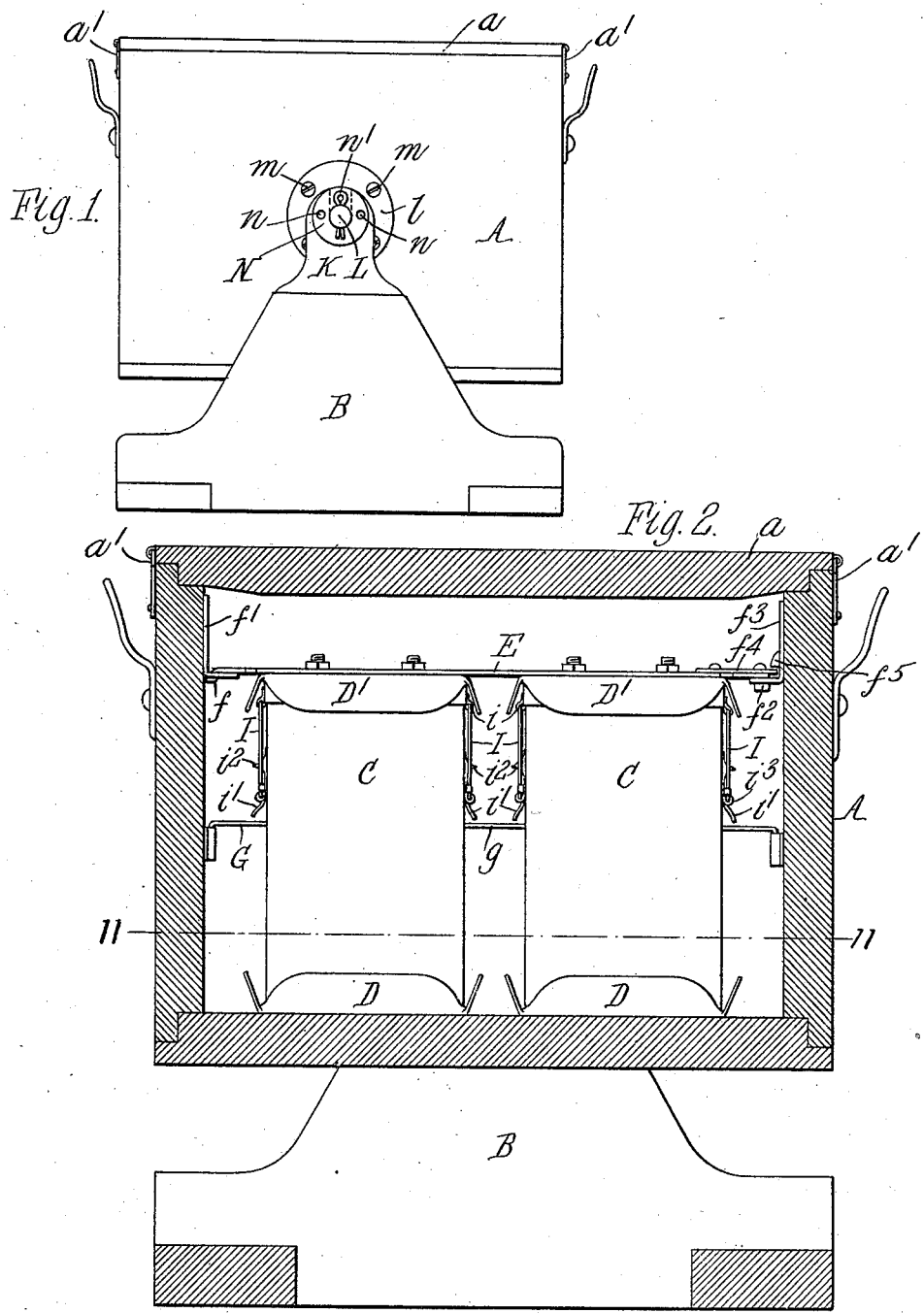

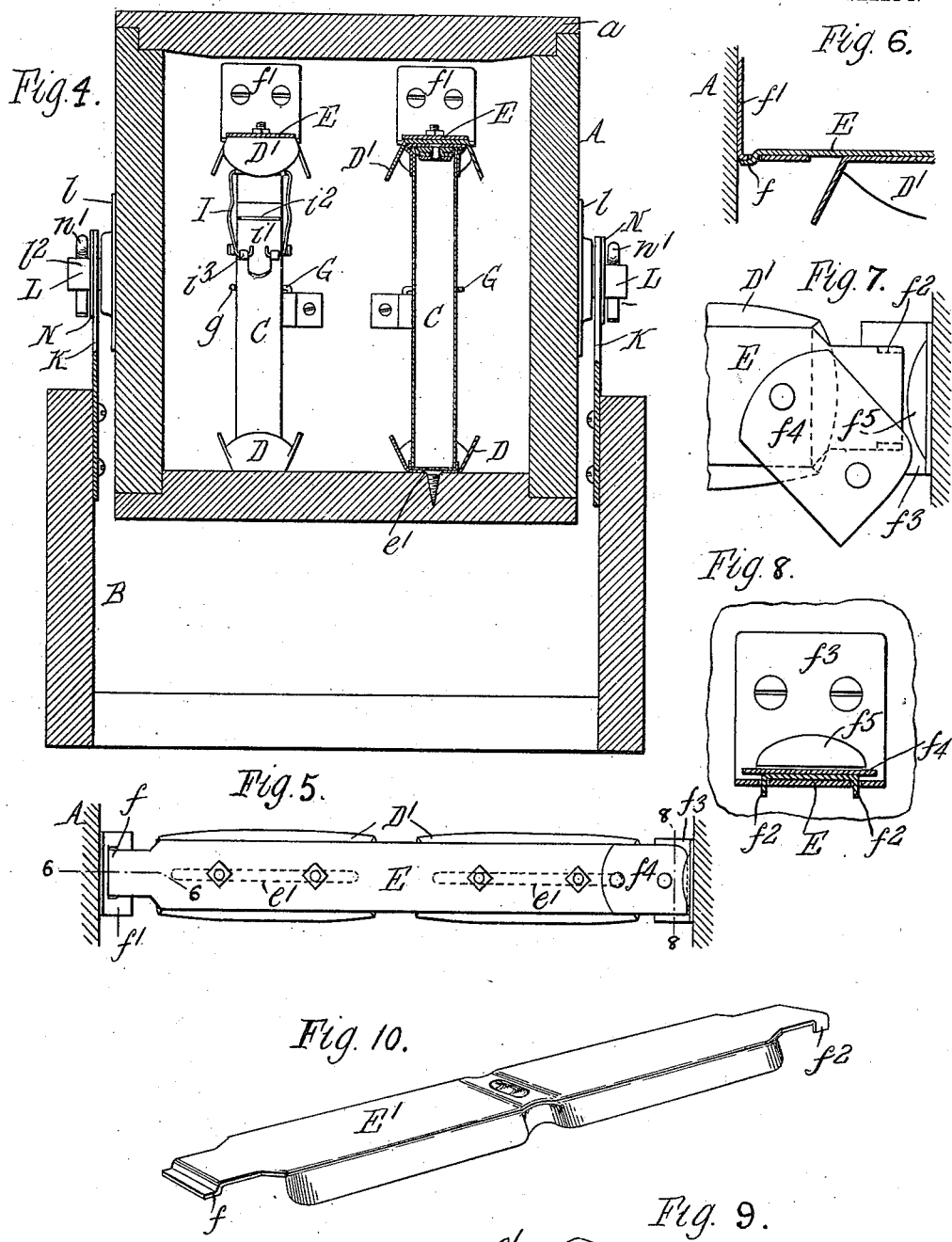

UNITED STATES PATENT OFFICE.

REUBEN C. ELDRIDGE, OF NIAGARA FALLS, ONTARIO, CANADA, AND DE WITT C. BREED, OF LOCKPORT, NEW YORK, ASSIGNORS TO NIAGARA FALLS ICE CREAM FREEZER COMPANY, OF NIAGARA FALLS, NEW YORK.

ICE-CREAM FREEZER.

974,761. Specification of Letters Patent. Patented Nov. 1, 1910.

Application filed March 23, 1908. Serial No. 422,788.

*To all whom it may concern:*

Be it known that we, REUBEN C. ELDRIDGE, a subject of the King of Great Britain, residing at Niagara Falls, in the Province of Ontario, Canada, and DE WITT C. BREED, a citizen of the United States, residing at Lockport, in the county of Niagara and State of New York, have invented a new and useful Improvement in Ice-Cream Freezers, of which the following is a specification.

This invention relates to ice cream freezers of that type in which the cream or other material is frozen in separate blocks or cakes in cans or receptacles, several of which are arranged surrounded by crushed ice and salt, or other suitable freezing material, in a box or cabinet which is mounted so that it can be rocked or agitated to facilitate the freezing action.

The principal objects of the invention are to provide holding devices for the cream cans of simple, inexpensive and practical construction, which enable the cans to be quickly and easily placed and secured in proper position in the box or cabinet and readily removed therefrom so that the operator's hands will not have to be immersed long in the freezing material; also to provide holding sockets for the cans of a form which act to guide the cans into proper position when placing them in the box or cabinet, and allow intimate contact of the freezing material with the top and bottom ends of the cans to insure the uniform freezing of the entire contents of the cans; also to provide simple means for temporarily retaining the cans in place until the holding means are applied and secured; also to make the can holding devices adjustable so that the box or cabinet can be made to accommodate a greater or less number of cans; and also to improve ice cream freezers of this type in the respects hereinafter described and set forth in the claims.

In the accompanying drawings, consisting of three sheets: Figure 1 is a side elevation, on a reduced scale, of an ice cream freezer embodying the invention. Fig. 2 is a longitudinal vertical section thereof. Fig. 3 is a fragmentary horizontal section of two of the cream cans and the device for temporarily retaining them in place. Fig. 4 is a transverse vertical section of the freezer. Fig. 5 is a plan view of one of the top holding devices for the cream cans. Fig. 6 is an enlarged longitudinal section of one end thereof, in line 6—6, Fig. 5. Fig. 7 is an enlarged plan view of the locking device therefor. Fig. 8 is an enlarged transverse section thereof, in line 8—8, Fig. 5. Fig. 9 is a perspective view of one of the can holding sockets detached and inverted. Fig. 10 is a perspective view of a holding device of modified construction. Fig. 11 is a horizontal sectional view of the box with the cans therein, in line 11—11, Fig. 2.

Like letters of reference refer to like parts in the several figures.

A represents the box or cabinet of the freezer which may be of any suitable water-tight construction, and is preferably provided with a removable cover $a$ which is held on the box by suitable cover fastenings $a'$. The box is mounted to rock or oscillate on a suitable base B, preferably as hereinafter described.

C represents the cans or receptacles in which the cream or other material is frozen. Each can is preferably of rectangular shape and suitable size to form a block or cake of cream large enough to serve two persons, and the freezer box can be made large enough to accommodate any desired number of the cans. The invention is not, however, restricted in regard to the size and shape of the cans nor to the number thereof in the box. The freezer shown in the drawings is provided with four cans arranged in two rows of two each. The cans are held stationary in upright position in the box by lower holders or sockets D in which the bottoms of the cans are seated and which are secured in rows in the bottom of the box, and by removable bars E, one of which is detachably secured in the box over each row of cans and is provided with inverted sockets or holding parts D' which embrace and confine the tops of the cans. The lower sockets or holders D are preferably formed of sheet metal pressed into the shape shown in Figs. 2, 4, 9 and 11, having bottoms conforming substantially in size and shape with the bottoms of the cans, and flaring side and end walls which enable the cans to be more readily inserted in the sockets and act to guide them into the proper position.

The bars E, shown in Figs. 2, 4 and 5, are provided with inverted sockets D', similar to the bottom sockets D, adapted to be engaged over the tops of the cans. The sockets D and D' can be secured in place in the bottom of the box and on the bars E by screws or bolts passing through longitudinal slots $e'$ in the bottoms of the sockets which allow the sockets to be adjusted to suitable positions in the box. In the larger freezers this enables a greater or less number of cans to be used, as may be desired. The flaring sockets only engage the extreme upper and lower ends of the cans so that spaces are left between their side walls and the cans which allow the freezing material to contact directly with the cans from top to bottom and insures a more uniform freezing of the contents of the cans.

For detachably securing the holding bars E in the box, each bar is preferably provided at one end with a hooked or bent tongue $f$, Fig. 6, adapted to be inserted in a slot in the horizontal portion of an L-shaped bracket $f'$ secured to one end of the box. The tongue can only be inserted in and withdrawn from the slot when the bar is in a more or less upright position, and when the tongue is inserted and the bar lowered to its horizontal holding position, the tongue cannot be disengaged from its bracket. The opposite end of the bar is provided with downturned lugs $f^2$, Fig. 8, adapted to enter slots in the horizontal part of an L-shaped bracket $f^3$ secured to the adjacent end of the box. A latch or plate $f^4$ pivoted to this end of the bar is adapted to be swung horizontally beneath an outwardly bulged portion $f^5$ of the upright part of the bracket $f^3$, to hold the lugs $f^2$ in their slots.

The described fastening means for the holding bars lock them securely and positively prevent the displacement thereof in the operation of the freezer. Nevertheless, the bars can be quickly and easily secured and detached, which is a great advantage as the hands do not have to be held long in the freezing material to manipulate the fastening devices. All of the parts of the can holders are preferably made from sheet metal pressed into shape and are therefore inexpensive to manufacture.

Instead of making the holding bar E and upper sockets D' of separate parts secured together, as above described, the sockets or parts to embrace the cans could be formed by properly shaped integral parts of a flanged bar, as represented by the bar E' in Fig. 10. The bar can be provided with the fastening devices above described. Similar bars could also be used for the bottoms of the cans instead of the separate sockets.

G, Figs. 2, 3 and 4, represents wires or rods for temporarily retaining the cans in position while the holding bars are being secured in place. These rods G are suitably secured to the ends of the box and extend horizontally from end to end thereof in position for the rows of cans which have been placed in the bottom sockets D to rest against them between laterally bent portions $g$ of the rods. The rods hold the cans so that the sockets on the holding rods can be readily engaged with their upper ends and so facilitate the securing of the cans in the box. They are more especially desirable in large freezers having a number of cans in each row, but they are not absolutely essential and may be dispensed with.

The bodies and covers of the cream cans or receptacles may be of any suitable construction to insure a tight inclosure of the cans and prevent the escape of their contents or the entrance of brine into the cans during the operation of the freezer.

Lever fastenings I are shown at the ends of the can cover for drawing the cover down tightly on the can and compressing the packing piece. Each fastening consists of a U-shaped bail of resilient wire hinged to the cover by an integral extension $i$ of the end wall of the cover which is bent up around the cross bar of the bail and soldered to the cover, and a lever $i'$ which is pivoted between its ends to the free end of the bail with one end adapted to bear against a fixed lug or projection $i^2$ on the can. The lever is preferably pivoted to inbent portions of the bail which enter loops $i^3$ formed at the sides of the lever and have upturned inner ends to prevent the disengagement of the lever from the bail. Any other suitable fastening means could be employed.

The base B, shown in the drawings, for supporting the freezer box so that it can be rocked or oscillated, consists of a wooden frame having upright metal bearing plates K secured on the inside of its opposite side pieces and provided with open-ended slots in which rest bearing trunnions L secured centrally to the opposite sides of the box A. Each trunnion, as shown, consists of a circular sheet metal plate $l$ with a raised center or boss, and a shouldered stud $l^2$ which is secured in a central hole in the plate. The trunnions are secured to a box by screws $m$ passing through holes in the edge portions of the plate $l$.

The trunnions are locked in the bearing slots to prevent accidental displacement of the freezer from the base, preferably by washers N which surround the trunnion studs and have projections n, formed therein by punching which engage in holes in the bearing plates. The washers are held on the trunnions by cotter pins n' or other suitable means. The freezer box can be readily detached from the base by removing the cotter pins and slipping the washers N outwardly on the trunnions to disengage their projections from the holes in the bearing plates, when the trunnions can be lifted out of the bearing slots.

The operation of the freezer is well understood. The cream or material to be frozen is poured into the cans and the cans closed and placed in the freezer box with their lower ends in the bottom sockets D and resting against the retaining rods G. The holding rods E are then placed in position, with their sockets D' engaging the tops of the cans, and secured. Finely crushed ice and salt in proper proportions are then packed in the box around the cans, after which the box is covered and rocked back and forth on the base until the material is frozen.

We claim as our invention:

1. In an ice cream freezer, the combination of a box, a plurality of receptacles arranged in a row in said box, holders in the lower portion of the box for the lower ends of said receptacles, a removable bar extending lengthwise of said row over said receptacles and having a socket for receiving and confining the upper end of each receptacle in the row, and means at opposite ends of said bar for releasably securing said bar in a fixed position in said box, substantially as set forth.

2. In an ice cream freezer, the combination of a box, a plurality of receptacles arranged in rows in said box, holders in the bottom of the box in which the lower ends of said receptacles are seated, bars having holders to receive the upper ends of said receptacles and hold them from movement in any direction, and means for rigidly but releasably securing said bars in said box above said receptacles with each holder thereof embracing the upper end of one of said receptacles, substantially as set forth.

3. In an ice cream freezer, the combination of a box, a plurality of receptacles arranged in a row in said box, holders arranged in the bottom of said box for the lower ends of said receptacles, a bar extending horizontally above said row of receptacles and having downwardly flaring sockets, each adapted to receive and confine the upper end of one of said receptacles, and releasable means for rigidly securing said bar at opposite ends in said box, substantially as set forth.

4. In an ice cream freezer, the combination of a box, a plurality of receptacles arranged in rows in said box, upwardly flaring sockets arranged in the bottom of said box to receive and confine the lower ends of said receptacle, bars extending horizontally above said rows of receptacles and having downwardly flaring sockets each adapted to receive and confine the upper end of one of said receptacles, and releasable means for rigidly securing said bars at opposite ends in said box, substantially as set forth.

5. In an ice cream freezer, the combination of a box, a plurality of receptacles arranged in a row in said box, holders in said box for the lower ends of said receptacles, a bar extending lengthwise of said row above said receptacles and having parts which engage and hold the upper end of said receptacle in fixed position, means at one end of said box with which one end of said bar detachably interlocks and in which it is adapted to swing upwardly to an upright position, a bracket at the opposite end of said box with which the other end of said bar engages, and a latch for holding said bar stationary on said bracket, substantially as set forth.

6. In an ice cream freezer, the combination of a box, a plurality of receptacles arranged in a row in said box, holders in said box for the lower ends of said receptacles, a bar extending lengthwise of said row above said receptacles and having parts which engage and confine the upper end of each of the receptacles, a bracket at one end of said box having a slot in which said bar detachably interlocks and is pivoted at one end, a bracket at the opposite end of said box with which the other end of said bar engages, and a latch for holding the bar stationary on said brackets, substantially as set forth.

7. In an ice cream freezer, the combination of a box, a plurality of receptacles arranged in a row in said box, holders in said box for the lower ends of said receptacles, a bar extending horizontally above said row of receptacles and having parts which engage and confine the upper ends of the receptacles, a bracket at one end of said box having a slot in which a hook at one end of said bar detachably interlocks, a bracket at the opposite end of said box having slots in which lugs at the other end of said bar engage, and a latch on said bar adapted to engage a part on said last mentioned bracket to lock said lugs in the bracket slots, substantially as set forth.

8. In an ice cream freezer, the combination of a box, a plurality of receptacles arranged in rows in said box, flaring holders in the bottom of the box in which the bottoms of said receptacles are seated, a rod arranged in said box at one side of each row of receptacles between the ends of said receptacles against which the receptacles are adapted to rest for temporarily retaining them upright, and bars releasably secured in said box above said receptacles and having flaring holders which embrace and confine the upper ends of said receptacles, substantially as set forth.

Witness our hands, this 19th day of March, 1908.

REUBEN C. ELDRIDGE.
DE WITT C. BREED.

Witnesses:
JESSIE B. McVEAN,
FRANCIS L. DURK.